(12) United States Patent
Mahyar

(10) Patent No.: US 10,930,263 B1
(45) Date of Patent: Feb. 23, 2021

(54) AUTOMATIC VOICE DUBBING FOR MEDIA CONTENT LOCALIZATION

(71) Applicant: Amazon Technologies, Inc., Seattle, WA (US)

(72) Inventor: Hooman Mahyar, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/367,814

(22) Filed: Mar. 28, 2019

(51) Int. Cl.
*G10L 13/08* (2013.01)
*G10L 13/033* (2013.01)
*H04N 21/485* (2011.01)
*G10L 15/00* (2013.01)
*G10L 15/16* (2006.01)
*G10L 13/00* (2006.01)

(52) U.S. Cl.
CPC ............ *G10L 13/033* (2013.01); *G10L 13/00* (2013.01); *G10L 13/086* (2013.01); *G10L 15/005* (2013.01); *G10L 15/16* (2013.01); *H04N 21/4856* (2013.01)

(58) Field of Classification Search
CPC .. G10L 13/00–2013/105; G10L 15/005; G10L 15/16; G10L 15/18; H04N 21/4856; G06N 20/00; G06N 20/20; G06N 3/02; G06N 3/08
See application file for complete search history.

(56) References Cited

U.S. PATENT DOCUMENTS

| | | | |
|---|---|---|---|
| 2008/0195386 A1* | 8/2008 | Proidl | G10L 13/033 704/235 |
| 2016/0021334 A1* | 1/2016 | Rossano | G10L 13/033 704/2 |
| 2020/0058289 A1* | 2/2020 | Gabryjelski | G10L 17/00 |
| 2020/0169591 A1* | 5/2020 | Ingel | H04L 65/605 |

OTHER PUBLICATIONS

Pascual De La Puente, Santiago, "Deep learning applied to Speech Synthesis" *Universitat Politècnica De Catalunya Master Thesis, TALP Research Center Signal Theory and Communications Department Escola Tècnica Superior d'Enginyeria de Telecomunicació de Barcelona* Jun. 30, 2016.

* cited by examiner

Primary Examiner — Abul K Azad
(74) Attorney, Agent, or Firm — Weaver Austin Villeneuve & Sampson LLP

(57) ABSTRACT

This disclosure describes techniques for replicating characteristics of an actor or actresses voice across different languages. The disclosed techniques have the practical application of enabling automatic generation of dubbed video content for multiple languages, with particular speakers in each dubbing having the same voice characteristics as the corresponding speakers in the original version of the video content.

20 Claims, 5 Drawing Sheets

AUTOMATIC VOICE DUBBING FOR MEDIA CONTENT LOCALIZATION

BACKGROUND

Media content localization involves the process of adapting media content to particular users consuming the media content. Media content localization is an important process to increase the customer engagement and satisfaction in technologies such as streaming video. For example, having video content with localized voices, rather than only having localized text subtitles, significantly impacts the global reach of streaming video service providers. Media content localization involves technologies such as video content analysis, language translation, and video dubbing (also referred to as voice-overs). Content studios spend significant amounts of time and money every year to generate localized voices for video media content. Dubbing is an especially challenging step in the media content localization process for the movie industry, since the process of dialogue translation relies on experts in the targeted localization language, such as, for example, Portuguese, French, Afrikaans, Japanese, and so forth. Previous attempts to automatically generate a localized dub for videos have had limited success because of the lack of diversity in available voices, accents, and other factors like age, gender, or speaking mode, which can result in, for example, relying on an adult voice for dubbing a child character.

DETAILED DESCRIPTION

This disclosure describes techniques for replicating characteristics of an actor or actresses voice across different languages. The disclosed techniques have the practical application of enabling automatic generation of dubbed video content for multiple languages, with particular speakers in each dubbing having the same voice characteristics as the corresponding speakers in the original version of the video content. For example, for the English language movie The Last Samurai starring the actor Tom Cruise playing the captured US Army Capt. Nathan Algren, a Japanese dubbing can be automatically generated, where the Japanese vocalization of the dialogue spoken by the Nathan Algren character replicates the speech characteristics of the actor Tom Cruise.

The disclosed techniques improve the technology of automatic media content localization by enabling generation of localized voices with greater similarity to the actor's or actresses' speaking characteristics, and/or in a shorter amount of time (e.g., on the timescale of hours, rather than weeks/months) compared to video dubbing using voice actors or actresses speaking in the targeted localization language. The disclosed techniques also improve the technology of streaming media content by allowing more rapid introduction of media content to different geographic regions while also improving the customer experience. An example will be instructive.

Figure 1:
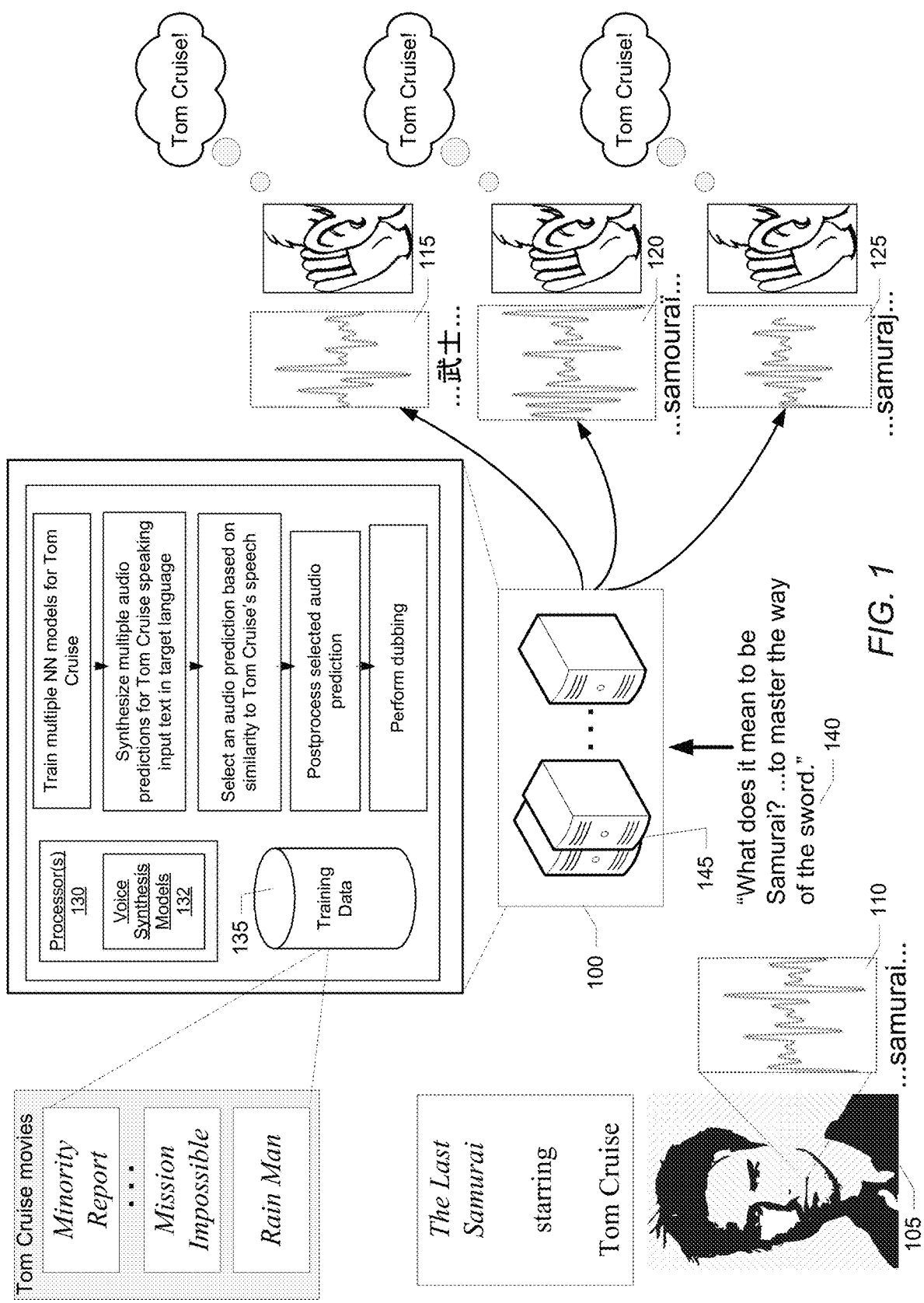
FIG. 1 illustrates an example of a system for automatic localization of media content.

FIG. 1 depicts a media content automatic localization system 100 capable of learning the characteristics of a speaker 105 (e.g., Tom Cruise), as recorded in audio 110 that is in English, and replicating the characteristics of speaker 105 in various languages, such as, for example, predicted audio 115 in Mandarin, predicted audio 120 in French, and predicted audio 125 in Swedish. In certain implementations, the disclosed techniques involve creating multiple independent voice synthesis models 132 implemented in hardware processors 130 in one or more media content localization servers 145. In various implementations, each voice synthesis model is specifically tuned for speaker 105, and each of the models is implemented using a neural network ("NN") structure. Each neural network structure provides a framework for machine learning algorithms that output a predicted audio waveform (or precursor for generating an audio waveform, such as parameters for a vocoder) in a target language (e.g., Mandarin, French, Swedish, etc.), based on inputs corresponding to, for example, movie dialogue in a source language (e.g., English, etc.).

In particular implementations, a set of the neural networks are trained using reinforcement learning techniques, and a different set of the neural networks are trained using supervised learning techniques. Each neural network is trained to learn to represent a particular set of speech features associated with the speech characteristics of speaker 105, rather than the linguistic characteristics of the language of audio 110 being spoken by speaker 105, or the textual characteristics of text 140 being spoken by speaker 105. The training process of each neural network involves a dataset 135 having corresponding text and audio samples of the speaker's voice (e.g., television shows, movies, interviews, advertisements, etc., involving Tom Cruise speaking).

Following training, to synthesize multiple predicted audio waveforms (each one also referred to as "predicted audio") for the speaker 105 speaking in the target language, each of these neural networks is provided a representation of text input, (e.g., the movie dialogue "What does it mean to be Samurai? . . . to master the way of the sword" as illustrated in text 140), and each neural network predicts as outputs an audio waveform (or parameters for generating an audio waveform) corresponding to the text input being spoken by the speaker 105 in the target language.

In various implementations, the disclosed techniques determine the similarity of the output of each independent neural network to Tom Cruise speaking the particular movie dialogue, for example, as extracted from the original version of The Last Samurai. The predicted audio of Tom Cruise speaking "What does it mean to be Samurai? . . . to master the way of the sword" in the target language that is most similar to Tom Cruise speaking the line in English, such as for parameters including but not limited to duration, min/max frequency, and so forth, is selected for subsequent steps in the media content localization process. In a range of implementations, the subsequent steps include further post-processing for tuning voice naturalness, local accent matching, and so forth. Other actors and actresses in the movie can undergo a similar process, and the video content can be automatically dubbed using the media content automatic localization system 100.

Figure 2:
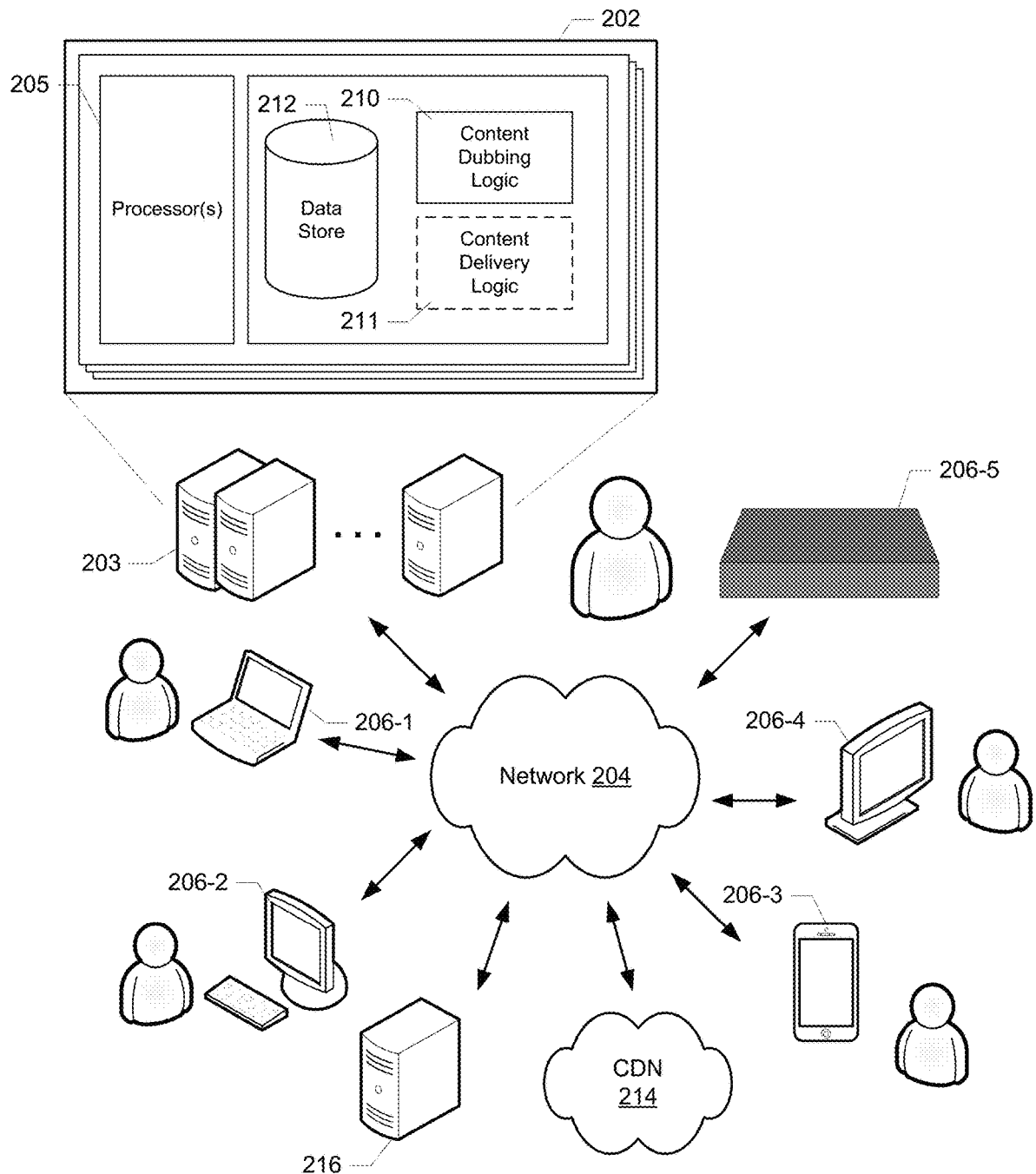
FIG. 2 illustrates an example of a computing environment for automatic localization of media content.

FIG. 2 illustrates an example of a computing environment in which video streams may be automatically dubbed and transmitted via network 204 to a variety of viewer devices (206-1 through 206-5) implementing the techniques described herein. Service 202 may conform to any of a wide variety of architectures such as, for example, a services platform deployed at one or more co-locations, each implemented with one or more servers 203 having one or more processors 205 (e.g., central processing units (CPUs), graphic processing units (GPUs), tensor processing units (TPUs), etc.). Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Viewer devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to content dubbing logic 210, service 202 may include other types of logic, such as content delivery logic 211, along with other logic (not shown) involved in content localization (e.g., subtitle translation, content moderation, accessibility enhancements, etc.) and delivery as part of a video-on-demand service or a live/broadcast video service.

In addition to dubbing video streams, service 202 may also include a variety of information related to the video content (e.g., other associated metadata and manifests in data store 212 which service 202 uses, or to which service 202 provides access or transmits to viewer devices 206).

Data store 212 may also include data representing machine learning model hyper-parameters, weights, biases, attention model parameters, etc., and training data associated with content dubbing logic 210. In some cases, any of the information in data store 212 may be provided and/or hosted by one or more separate platforms, e.g., CDN 214 or other third-party platform 216. It should be noted that, while logic 210 and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
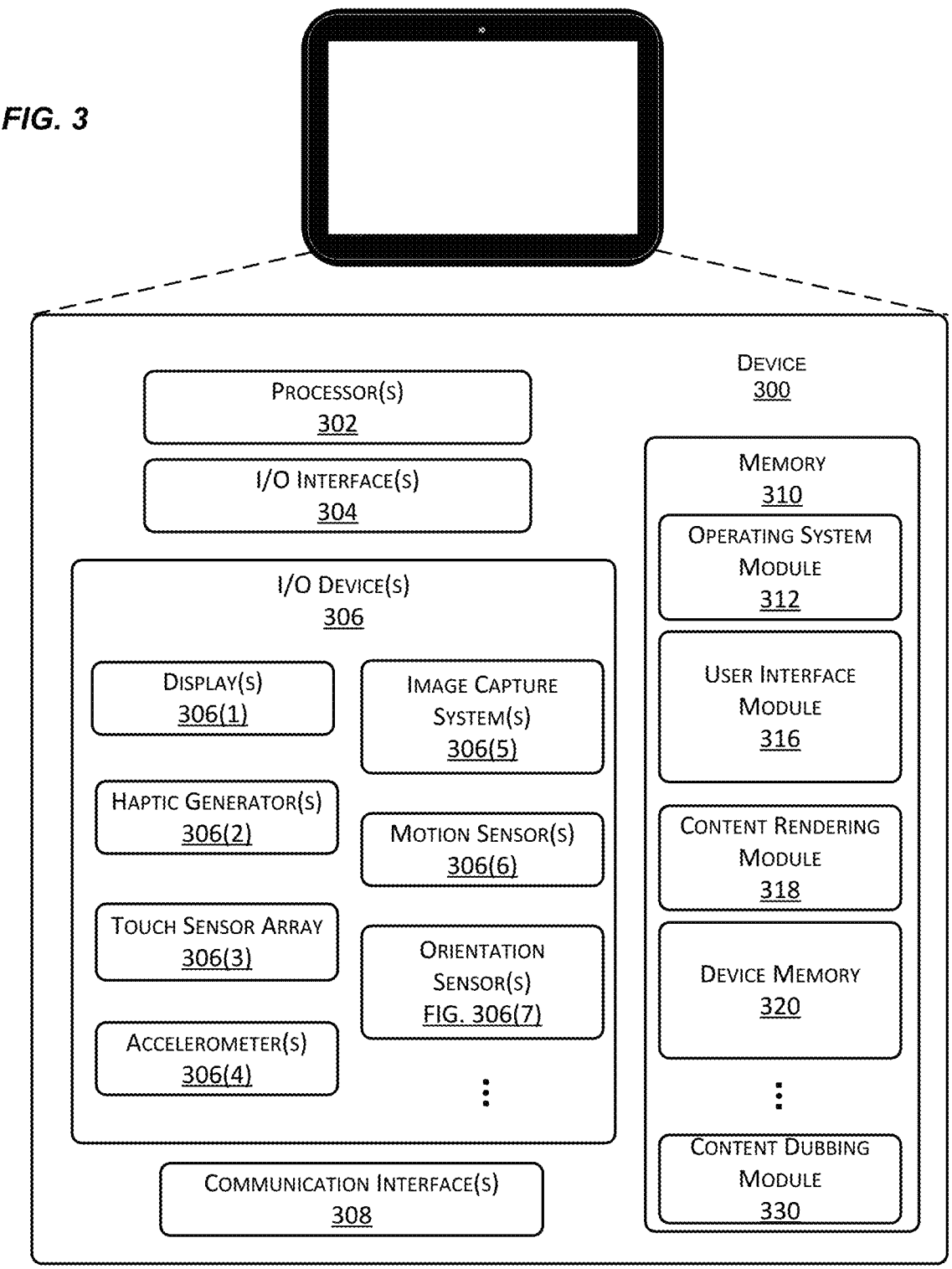
FIG. 3 is a simplified block diagram of a viewer device in which various implementations of automatic localization of media content may be practiced.

A block diagram of an example of a viewer device 300 suitable for use with various implementations is shown in FIG. 3. Viewer device 300 may include a wide variety of device types. In FIG. 3, viewer device 300 is depicted as a tablet device and includes one or more single or multi-core processors 302 configured to execute stored instructions (e.g., in device memory 320). Viewer device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with viewer device 300.

Viewer device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Viewer device 300 also includes one or more buses or other internal communications hardware or software (not shown) that allow for the transfer of data and instructions between the various modules and components of the device.

Viewer device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of viewer device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

It will be understood that viewer device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

In certain implementations, viewer device 300 receives the final dubbed video content. In various implementations, a portion of the processes associated with content dubbing logic 210 in FIG. 2 may be implemented in content dubbing module 330 in viewer device 300. For example, training of the neural network structures for each of the voice synthesis models 132 for the speaker 105 can occur at the one or more servers 203 implementing service 202. The hyper parameters of each neural network and the values of parameters following training (e.g., weights and biases of artificial neurons, forget gates, etc.) can be transmitted to the viewer device 300, thereby allowing the voice synthesis process to occur at the viewer device 300. For example, in various implementations, viewer device 300 can configure computing resources provided by the processors 302 to implement the neural network structures using the received hyper parameters and trained parameters. Content dubbing module 330 can generate multiple audio predictions for speaker 105 using the multiple neural network structures. Content dubbing module 330 can also perform selection of an audio prediction based on similarity to a recording of speech from speaker 105. In various implementations, content dubbing module 330 can also handle post-processing of the audio prediction that is selected, and perform dubbing using the post-processed predicted audio locally at the viewer device 300, rather than receiving the dubbed video content from service 202. It should be appreciated that the disclosed techniques for automatic media content localization can be distributed across the content dubbing logic 210 at service 202 and the content dubbing module 330 at viewer device 300 to varying degrees (e.g., variable apportioning of model training, speech synthesis, predicted audio selection, post-processing, dubbing, etc.). In some implementations, hyper parameters and/or trained parameters for the neural network structures can be periodically updated and transmitted from service 202 to the viewer device 300, thereby allowing the voice synthesis models to evolve.

Figure 4:
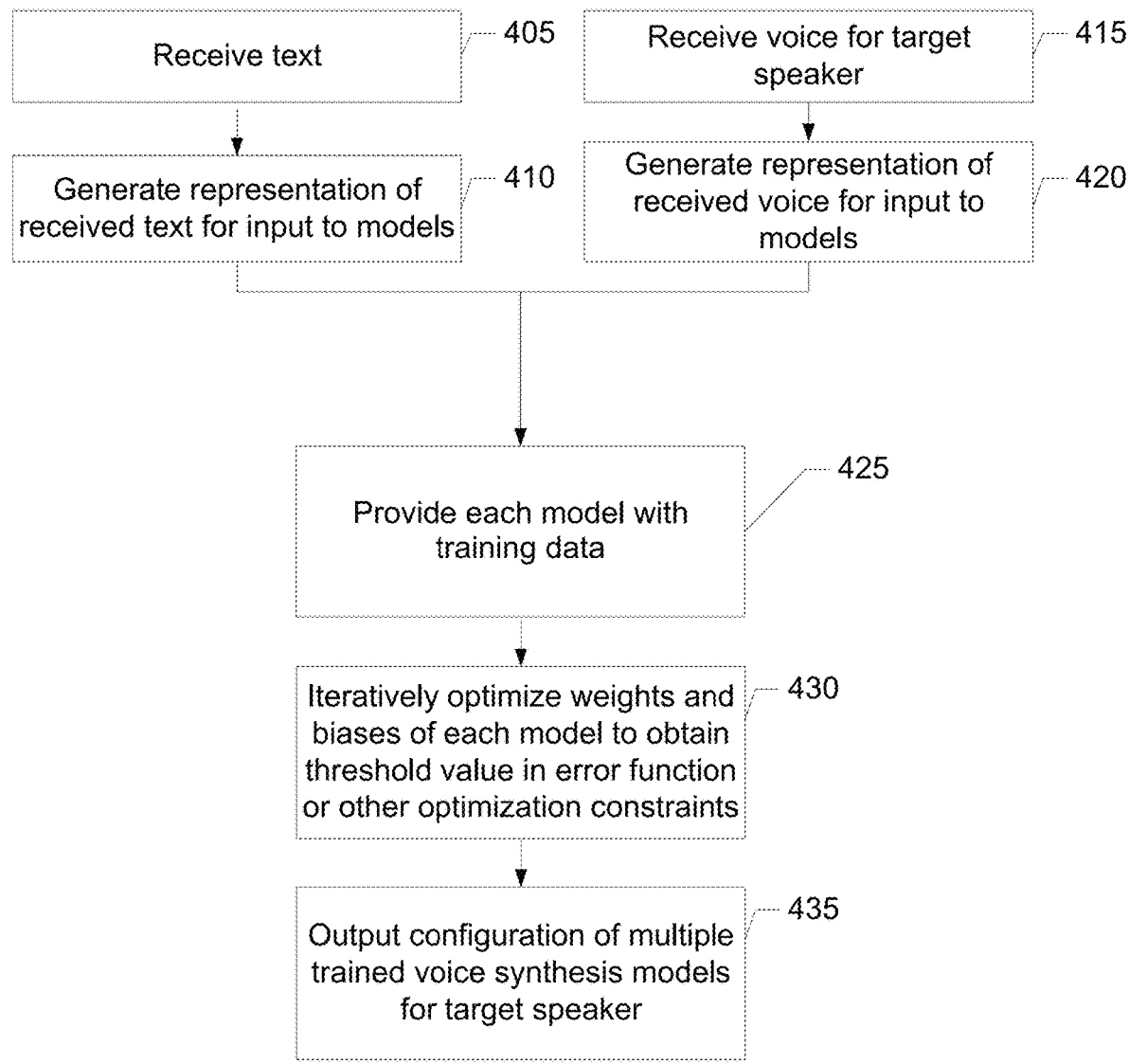
FIG. 4 is a flowchart illustrating a training process for automatic localization of media content.

FIG. 4 is a flowchart illustrating a training process for the voice synthesis models used in automatic localization system 100. Each voice synthesis model is trained using samples of text and samples of audio corresponding to the samples of text as spoken by the speaker that is being modeled.

In certain implementations, at step 405, the automatic localization system 100 receives text, such as subtitles, dialogue, movie scripts, interview transcripts, etc. from various media content that includes speech by the target speaker (e.g., television shows, movies, interviews, songs, etc.) corresponding to the received text. It should be appreciated that the received text can be in a variety of formats (e.g., ASCII, Unicode, etc.), number of languages (e.g., one, more than one), types of languages, and so forth. In some implementations, the received text is raw text. In various implementations, the received text may have undergone natural language processing (e.g., one or more of input normalization, tokenization, deletion/escaping of non-translatables, lower casing, sentence segmentation, translation, etc.).

In some implementations, the received text is associated with start/stop times for speech samples corresponding to the received text, also referred to herein as an utterance. Each utterance is associated with a particular actor or actress in the media content. For example, from minute 1 to minute 2, actor A is speaking, while from minute 3 to minute 4, actress B is speaking. It should be appreciated that a wide variety of speaker identifiers (e.g., actor/actress names, character names, etc.) and temporal identifiers (e.g., absolute times, relative offsets, etc.) can be used to align the text and speech samples for each speaker. It should also be appreciated that text delimiters in the received text (e.g., lines 3-10, etc.) can be used in conjunction with or in the alternative to the temporal delimiters to align text and speech samples in the training data.

In various implementations, the training data can be automatically generated, such as by using voice activity detection over a large catalog of media content to automatically extract timings for delimiting utterances, and classification techniques (e.g., speaker identification, clustering, etc.) can be used to associate a particular timing/set of text elements with an utterance by a particular actor/actress.

In a range of implementations, at step 410, the automatic localization system 100 can also generate a representation of the received text for facilitating input to the voice synthesis models. For example, the received text is processed into a representation for interfacing to the particular algorithmic structure and/or learning paradigm of the voice synthesis model. For instance, raw text is appended with labels to facilitate supervised learning. In certain implementations, the representation includes contextualized prosodic information (e.g., intonation, tone, stress, rhythm, etc.) and/or phonetic features. For instance, the representation can provide a phonetic transcription of windowed phonemes, such that synthesis of a particular phoneme accounts for surrounding phonemes for articulation analysis. Further examples of information that can be included in the representation of the received text include but are not limited to, information about stress and/or accents, forward and/or backward position, quantity, separation distances, part-of-speech, modality, length, etc. at the phoneme, syllable, word, utterance, phrase, sentence or other levels of textual granularity.

In some implementations, the generated representation of the received text is referred to as a "middle language," and the middle language includes a phonetic transcription of the received text from step 405, and also includes information about one or more audio characteristics associated with the received text from step 405. Examples of such audio characteristics include, for example, audio contextual labels (e.g., "speaking in angry voice:") that instruct the particular actor or actress to speak movie dialogue in a particular manner/mode of speech (e.g., volume, rate, emotion, etc.). In such an example, the audio characteristic is derived from the received text from step 405, rather than a speech characteristic actually extracted from a recorded speech sample of the target speaker to model.

In various implementations, the audio characteristics derived from the received text can be incorporated into the processing in step 420 of the received voice for the target speaker in step 415 (e.g., labeling the speech sample as "angry speech"). In particular implementations, the audio characteristics appended to the phonetic transcription in the middle language includes speaker-specific characteristics derived from analysis of the speech samples received at step 415 or processed at step 420.

The representation of the received text from step 405 can be implemented in a variety of formats, label syntaxes, and data structures. In some implementations, the generated representation can be structured as a vector. For example, the middle language can have a first set of vector elements representing phonetic transcription of the received text, and a second set of vector elements representing the additional audio characteristics associated with the received text.

In certain implementations, at step 415, the automatic localization system 100 receives recorded speech samples (also referred to as voice samples) of the target speaker from various media content (e.g., television shows, movies, interviews, speeches, presentations, press conferences, auditions, performances, songs, etc.) corresponding to the received text. It should be noted that the voice samples can be in a variety of formats (WAV, MP3, compressed or uncompressed, etc.), quality levels (bit rates, sampling rates, etc.), channel configurations (mono, stereo, etc.), and so forth.

In some implementations, raw audio samples are provided to the inputs of the voice synthesis models. In a range of implementations, at step 420, the automatic localization system 100 can also generate a representation of the received voice for facilitating input to the voice synthesis models. For example, de-noising, filtering, normalization, and/or signal processing to derive value such as short-time Fourier transform (STFT) coefficients, cepstral representations, spectrogram representations, Mel-frequency cepstral coefficients (MFCCs), sinusoidal models, and so forth, can be performed at step 420. As another example, the received voice can be represented parametrically, such as by encoding with a phase vocoder to generate a voice feature vector windowed and shifted over a series of time intervals.

In certain implementations, the received speech samples at step 415 include multiple speakers, therefore speaker classification/clustering is performed at step 420 to provide speaker identification for different subsets of the received speech samples at step 415. The different subsets are then used as different training data for the various voice synthesis models, such that a trained voice synthesis model is specific to a particular speaker (e.g., in contrast to a trained voice synthesis model learning to replicate multiple speakers). It should be appreciated that the same voice synthesis model structure (e.g., the hyper parameters for a particular neural network) may be in common for modeling speaker A and speaker B, but each speaker would be associated with a separate training process such that the same neural network structure would have different weight/biases, etc., following the training process.

In step 425, training data is provided to each of the voice synthesis models for the target speaker. In some implementations, the text received at step 405 and/or the voices received at step 415 are provided as the training data inputs to the voice synthesis models. In various implementations, the generated representation of received text in step 410 and/or the generated representation of the received voices in step 420 are provided as the training data inputs to the voice synthesis models. In some implementations, the generated representation of received text in step 410 and the generated representation of the received voices in step 420 better facilitates training of the voice synthesis models in comparison with the received text at step 415 and the received voices at 415. For instance, using the generated representation of received text in step 410 and the generated representation of the received voices in step 420 as inputs can reduce the computation time for an iterative process that minimizes the error function associated with a comparison of predicted audio output by the voice model with speech samples of the target speaker.

As part of step 425, the training data is provided to multiple voice synthesis models, each one implementing a particular machine learning algorithm. Each of the multiple machine learning algorithms learns to model the same voice, namely the target speaker corresponding to the received voices at step 415.

It should be appreciated that any of a wide variety of machine learning algorithms that provide a framework for generating an audio signal of variable length from a set of textual entities can be used (e.g., regression, rather than classification).

In various implementations, one of the multiple machine learning algorithms uses a representation learning (i.e., feature learning) algorithm trained under a supervised learning paradigm ("teaching by example"), such as a deep learning (DL) algorithm. The deep learning process provides multiple transformations of the input training data within the voice synthesis model, and as the training data flows through the multiple stages of the model, the model learns to represent different sub-types of information (e.g., features) embedded within the training data, and the learned features can interact to form predicted audio corresponding to speech waveforms during a voice synthesis process.

The deep learning algorithms use one or more neural network structures with multiple layers (e.g., deep neural network (DNNs)). Multilayer neural network structures include inter-connected processors called neurons with particular weights and biases that result in particular activations in response to inputs to the neural network structure. The neural network structure results in successive application of non-linear functions that transform an input into a vector where a decision or prediction can be made.

The neural network structures in automatic localization system 100 can be implemented with, for example, convolutional neural networks (CNN), regional convolutional networks (RCNN), recurrent neural networks (RNN) such as, for example, long short-term memory (LSTM) RNNs, generative adversarial networks (GAN), or any combination thereof. In particular implementations, the neural network structures may also use architectures relating to deep belief network (DBN), bidirectional networks, encoder/decoder architectures, and/or attention mechanisms that allow the neural network to selectively refer back to portions of the input sequence (e.g., via weights), instead of requiring the neural network to output all information to a fixed length vector. In various implementations, the particular structure (e.g., hyper parameters, such as the number of layers, neurons, learning rate, etc.) for the neural network may be obtained through a neural architecture search.

In certain implementations, one of the multiple machine learning algorithms uses a representation learning algorithm trained under the reinforcement learning (RL) paradigm ("teaching by experience"), where rather than training using supervised learning with labeled input/output pairs, learning occurs through a model-based, value-based, or policy-based approach which attempts to maximize expected return. For example, one approach for maximizing expected return includes Q-learning, where the optimal Q function provides a policy for deriving the optimal action for maximum return given a particular state. In instances where using the optimal Q function is not computationally feasible, a Q* function that approximates the optimal Q function is used. In some implementations, various aspects of the reinforcement learning algorithms can involve neural network structures, such as in a deep reinforcement learning framework, where a neural network approximates the optimal Q function (e.g., adjusting the weights and biases of the artificial neurons to encourage outcomes with greater return/reward). The reinforcement learning algorithm used in the automatic localization system 100 can implement one or more policies for learning, including but not limited to state reinforcement, Q learning, deep Q-networks (DQN), a vanilla policy gradient (also called REINFORCE), actor-critic methods (e.g., A2C, A3C, etc.), proximal policy optimization (PPO), deep deterministic policy gradients (DDPG), and so forth.

The number of and types of voice synthesis models utilizing machine learning algorithms can vary based on the number and types of language mappings (e.g., English to Spanish, English to Japanese, French to Mandarin, etc.), or the speaker being modeled (e.g., certain neural network configurations may provide higher-quality representations of a speaker with high-pitched voices rather than low pitched voices, etc.). As one example, automatic localization system 100 has two voice synthesis models, one using deep learning and the other using reinforcement learning. In another example, automatic vocalization system 100 has five voice synthesis models, four using deep learning and one using reinforcement learning. It should be appreciated that these quantities and the distribution between different learning paradigms are merely examples, and can also be dynamically adjusted based on the particular voice dubbing usage scenario.

In step 430, each of the voice synthesis models are trained. In various implementations, the training (i.e., learning) process involves evaluating an error function (i.e., cost function, difference function, etc.). Given a particular error function, the training process seeks to reduce the error. In a neural network framework, the error is based in part on the particular values of the weights and biases of the artificial neurons implementing, for example, the voice synthesis model. In various implementations, the process of determining derivatives to guide the process for decreasing the error uses the Back-Propagation (BP) algorithm. The BP algorithm enables tracing of the propagation of errors backwards through the neural network structure, from the output layer to the input layer, in order to efficiently compute gradients representing the proportional relationship between modifications to the existing values of weights and biases and the extent of corrections (e.g., reduction in error) at the output of the neural network.

In some implementations, computing the gradient using the BP algorithm or other techniques is followed by an optimizer that governs the process of iteratively selecting modifications to the values of weights and biases to reduce the error (e.g., traversing the topology of the computed gradient), or to reach some other optimization constraint in step 430 (e.g., time constraint, power consumption constraint, computation cycles constraint, etc.). The automatic localization system 100 can use any of a variety of optimizers, including but not limited to stochastic gradient descent (SGD), momentum SGD, Adam, and so forth. In certain implementations, the training process can also include the use of other optimization techniques, such as, for example, regularizers (e.g., weight decay, dropout, etc.), normalization (batch norm, layer norm, weight norm, etc.), and/or re-parameterization.

During training, each voice synthesis model learns to represent features that correlate with characteristics of the speaker, rather than with characteristics of the language or the text itself, and the output of the training process (step 435) is a set of voice synthesis models, each one with a particular configuration (e.g., specific learned values for the weights and biases of the artificial neurons) for taking, for example, input text and outputting predicted audio that replicates the speech characteristics of a target speaker in a target language. For example, each voice synthesis model learns to convert the previously discussed input text represented as a middle language into a predicted speech waveform spoken in a different language, but in a manner similar to the speech characteristics of the target speaker.

Examples of speaker characteristics that each voice synthesis model learns to represent for the target speaker include but are not limited to gender, pitch (e.g., soprano, bass, etc.), age, volume, tone, duration, inflection of voice, and speech rate (e.g., pauses between words, etc.). In some implementations, the set of speaker characteristics may vary for different voice synthesis models (e.g., speaker characteristics learned by a reinforcement learning algorithm may differ than the speaker characteristics learned by a deep learning algorithm). In various implementations, for a particular speaker characteristic, different voice synthesis models may exhibit different errors (e.g., for the pitch characteristic, a first model may be more effective at replicating a target speaker with a high-pitched voice, and a second model may be more effective at replicating a target speaker with a low pitched voice).

In certain implementations, the set of speaker characteristics, attributes, or patterns, also referred to as a speaker vector or speaker embedding (which may also include information such as I-vectors, D-vectors, etc.), also includes features learned by the neural network structure, such as features represented by the hidden states, which may have no analogous parameter in the domain of speech analysis by humans. For example, a neural network may learn to represent speech characteristics in the training data based on features unrelated to prosodic analysis of words, phonemes, etc., as used in speech analysis by humans.

Figure 5:
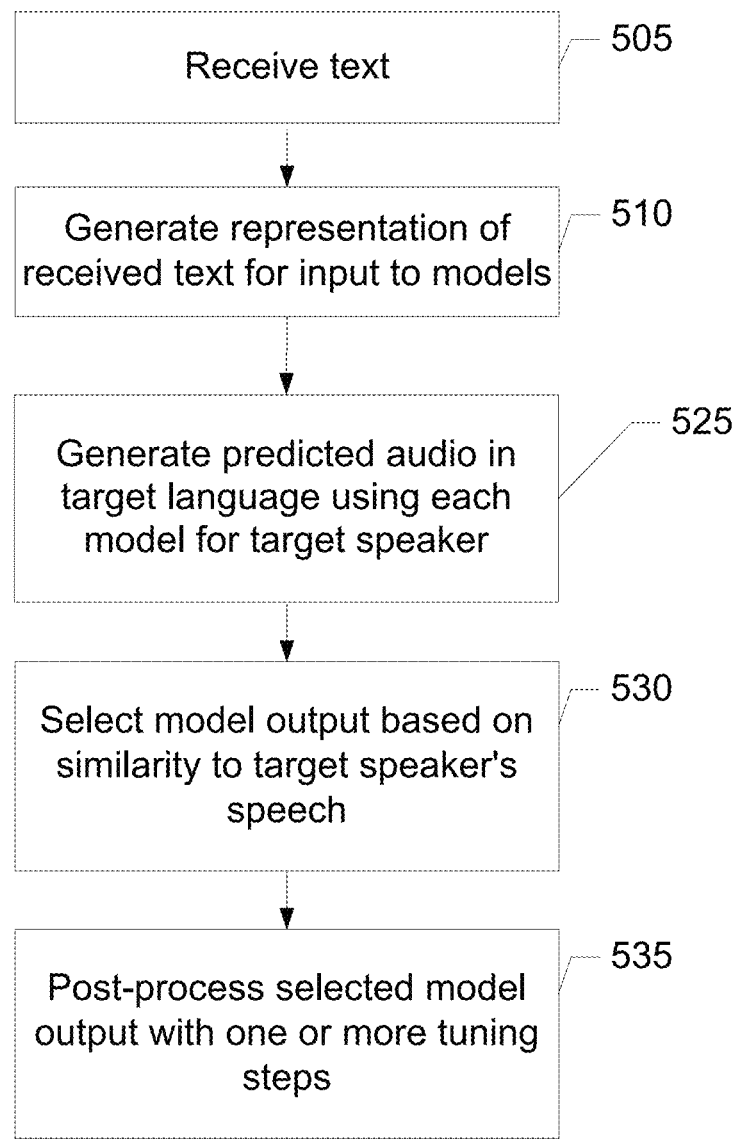
FIG. 5 is a flowchart illustrating a prediction process for automatic localization of media content.

FIG. 5 is a flowchart illustrating a process for generating predicted audio waveforms for the voice synthesis models used in automatic localization system 100. In certain implementations, at step 505, the automatic localization system 100 receives text, such as subtitles. Similar to step 405 of FIG. 4, it should be appreciated that the received text can be in a variety of formats, types of languages, and may have undergone natural language processing.

In a range of implementations, at step 510, the automatic vocalization system 100 generates a representation of the received text for facilitating input to the previously trained voice synthesis models. In some implementations, the generated representation of the received text is the previously discussed middle language, which includes a phonetic transcription of the received text from step 505. The generated representation of the received text can also include audio characteristics associated with the received text from step 505. The audio characteristics can include, for example, audio contextual labels, such as "speaking in soft voice:", which indicates the movie dialogue should be spoken in a particular manner, such as softly. Continuing the example, the indication that the movie dialogue should be spoken in a soft voice can be included as a vector element (e.g., binary flag, enumerated list, etc.) in a vector representing the middle language. As an illustration, for the same dialogue text, target speaker, and target language, a first voice synthesis model that receives a vector representing the middle language that includes, for example, an indication soft voice=TRUE, generates predicted audio at step 525 that is softer in volume than a second voice synthesis model that receives a vector representing the middle language that includes an indication soft voice=FALSE.

In some implementations, at step 525, each voice synthesis model generates audio in the language corresponding to the input text received at step 505, which can be determined using an appended language identifier, or through text analysis for language detection. For example, Spanish subtitles provided to a voice synthesis model results in audio in the Spanish language. In a variety of implementations, the input text is automatically translated to a target language as part of generating a representation of the received text at step 510, and the predicted audio corresponds to the post-translation language (i.e., predicted audio can be a language different than the text received at step 505).

In certain implementations, a particular actor/actress corresponds to one speaker, even if the particular actor/actress is multilingual. For example, an actor who can speak both Spanish and English can be associated with the same speaker identifier.

In various implementations, a particular speaker may be associated with multiple voice synthesis models, also referred to as multiple "voices" or multiple "models." For example, for a particular speaker corresponding to actor A, the automatic localization system 100 may include voice 1 corresponding to modeling actor A using a first voice synthesis model (e.g., a model using reinforcement learning), and include voice 2 corresponding to modeling the same actor A using a second voice synthesis model (e.g., a model using deep learning). As mentioned previously, the number of and types of voice synthesis models (e.g., neural network hyper parameters, reinforcement learning, deep learning, etc.) for actor A can vary based on the number and types of language mappings, or the characteristics of the actor A being modeled (e.g., certain neural network configurations may provide higher-quality representations of actor A's voice inflections, etc.).

It should be appreciated that an individual voice synthesis model can include multiple neural network structures, with the output of one neural network in the model being used as inputs to a second neural network in the model. However, this should be distinguished from the use of multiple voice synthesis models by automatic localization system 100, where the output of each of the voice synthesis models at step 525 is independent (e.g., predicted audio generated by each model is not dependent on the outputs of another model). For example, a first voice synthesis model using reinforcement learning and a second voice synthesis model using deep learning each output at step 525 a respective voice for the same speaker based on input text (e.g., for identical input text, each model generates its own prediction of an audio waveform). In a range of implementations, each of these independent voice synthesis models are specific to the target speaker, rather than a particular trained voice synthesis model being used to predict audio for different actors/actresses.

It should be appreciated that for particular languages, the quality of predicted audio output at step 525 for certain models may be higher-quality (e.g., sound more natural, replicate the target speaker more closely, etc.) than for other models. In some implementations, only certain models may be activated for certain target languages (e.g., for a given target language, certain models will not generate predicted audio). In various implementations, each voice synthesis model is not associated with a particular language (or group of languages). For example, irrespective of the target language, a voice synthesis model may always generate predicted audio.

After each of the voice synthesis models generate predicted audio, model selection (e.g., which may also include model scoring, model ranking, etc.) by a predicted audio selector (also referred to as a voice synthesis model selector) is performed based on the characteristics of each predicted audio. For example, each predicted audio differs from the speaker's speech when certain parameters are analyzed. Model selection at step 530 can optimize and prioritize such differences to prefer certain models over other models. For example, parameters including but not limited to duration (e.g., duration of the entire utterance, silent periods, etc.), max/min frequencies (e.g., 300 Hz to 3400 Hz, or other frequency ranges), fundamental frequency (e.g., frequency content below the minimum frequency, but with harmonic series content within the max/min frequencies), frequency envelope/contour, intensity/pressure level (e.g., decibels, etc.), and so forth, are compared between a speech sample for the speaker (e.g., recording of Tom Cruise speaking "Hello how are you?" in English) and the pure voices synthesized in the target language (e.g., two predicted audio waveforms for Tom Cruise speaking "Hello how are you?" in Japanese). Following the example, the speech sample may have a duration of 4 seconds, the first predicted audio in Japanese is 10 seconds, and the second predicted audio in Japanese is 3 seconds. Based on duration analysis, the second predicted audio is more similar to the speech sample, and therefore is preferred over the first predicted audio. Continuing the example, for fundamental frequency analysis, the speech sample may be at a fundamental frequency of 100 Hz, the first predicted audio in Japanese at 102 Hz, and the second predicted audio in Japanese at 83 Hz. Based on fundamental frequency analysis, the first predicted audio is more similar to the speech sample, and therefore is preferred over the second predicted audio. It should be appreciated that similarity analysis can be performed for a wide range of speech features.

In certain implementations, the similarity between a speech sample and a predicted audio for a parameter may be prioritized over other parameters when selecting a particular model. Referring to the above example, even though similarity analysis of the fundamental frequency and duration indicate different models to prefer, the duration parameter may be of higher priority in speaking "Hello how are you?" then minimizing the difference in fundamental frequency. It should further be appreciated that a wide variety of techniques can be employed for the similarity analysis. For example, similarity analysis across the various parameters can utilize weighted averages, or a vector space approach (e.g., cosine similarity, etc.), and so forth, and may also incorporate the use of neural network structures.

It should be appreciated that the relative priorities of parameters may be dynamically adjusted based on the input text (e.g., short utterances may de-prioritize duration), speaker characteristics (e.g., a speaker such as James Earl Jones recognized for a low-frequency pitch may prioritize/min frequencies), target language (e.g., languages such as Cantonese which heavily incorporate tone changes may prioritize inflection characteristics), and so forth.

In some implementations, model selection occurs prior to a user requesting the particular media content being localized. In various implementations, model selection can occur dynamically in response to a user request for the particular media content for localization. For example, user data received together with a content request (e.g., such as for manifest data) may indicate a preference for speech with lower volume and less bass for night mode watching purposes.

In particular implementations, the predicted audio output of each voice synthesis model is also referred to as a pure voice output ("pure voice"), and the selected predicted audio is post-processed using, such as, for example, a sequence of filters. For example, in implementations where the mean square error (MSE) criterion is used in the neural network learning process, the assumed Gaussian distribution of the output data dampens the variability of effects relating to the naturalness of speech. Post-processing steps can re-introduce such variability (e.g., fluctuations in resonance, etc.) to restore naturalness. It should be appreciated that post-processing is not limited to increasing variability, such as post-processing steps directed to injecting locale specific characteristics such as, for example, accents specific to a geographic region, etc.

The post processing at step 535, collectively referred to as "voice tuning," tunes the pure voice to increase naturalness, fluency, etc. Voice tuning can involve adjusting parameters (also referred to as "localization parameters") such as resonance, accent (e.g., northern Spanish accent, southern Spanish accent), and so forth. Certain voice tuning parameters can also account for prosodic information, including but not limited to intonation, phoneme duration, pauses between words, etc. Certain voice tuning parameters can further account for acoustic information (e.g., spectral characteristics, etc.).

In various implementations, linguistic analysis is integrated into the voice tuning. For example, emphasis on certain syllables can be injected during voice tuning. In some implementations, idiosyncratic characteristics of the target speaker can also be incorporated into the post processing at step 535 (e.g., tuning the fundamental frequency, adjusting the min/max frequencies, etc.).

In certain implementations, the number of post processing steps ranges from 2-5 steps, though it should be appreciated that the specific quantity may vary. The number of post-processing steps may also be dynamic with respect to the speaker characteristic, input text, or target language. The output of the post processing at step 535 is referred to as the "tuned voice" in the target language. Multiple utterances in the tuned voice in the target language can be concatenated (e.g., combining phrases, sentences, etc.), and audio in alignment with the subtitles in the target language can be provided as inputs to a video dubbing system.

While certain examples of the disclosed techniques are in the context of video dubbing, it should be appreciated that the disclosed techniques have further practical applications in use cases including but not limited to text to speech (TTS) for e-book reading, improving accessibility for the sensory impaired, dubbing of audio-only media content (e.g., radio/podcast content), live or on-demand content, and so forth.

In some implementations, a previously dubbed video content (e.g., a classic movie from several decades ago) may be partially redubbed using the disclosed techniques, such that the media content uses both the disclosed automatic dubbing technique and conventional dubbing techniques (e.g., certain popular actors/actresses use the disclosed automatic dubbing technique, other actors/actresses with minor parts use voice actors in the target language). It should be appreciated that as the amount of training data changes over time, different subsets of the actors/actresses within media content may undergo automatic dubbing using the disclosed techniques.

In certain implementations, the customer can provide feedback on the results of the automatic dubbing that can be used to adjust the training, synthesis, model selection, and/or post-processing processes. For example, certain neural network models may be strongly associated with negative votes, and therefore excluded from the available options for model selection.

In a range of implementations, the customer can modify the training process (e.g., providing non-publicly available training inputs such as personal conversations, etc.), the predicted audio selection process (e.g., indicating a preference to match certain parameters over others, etc.), and/or the post-processing steps (e.g., indications of preferences for certain types of tuning, such as pitch or volume, etc.). It should be appreciated that the characteristics of the media content playback system (e.g., frequency response of the surround sound set up, etc.) can also be used as inputs to the video dubbing process.

It should be appreciated that the disclosed techniques for replicating speech characteristics are not limited to human speech, and can be adapted to a wide variety of vocalizations (e.g., singing, laughing, crying, screaming, etc., animals such as an African grey parrot mimicking humans, voice assistive devices for the speech impaired, etc.).

It should be noted that the techniques described herein are agnostic to specific audio or video codec implementations, and may be employed for any of a wide variety of audio and video compression standards.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, including:
   receiving, by a first voice synthesis model trained using deep learning to replicate a first set of speech features for a first actor, a first vector, the first vector including a phonetic transcription of first subtitle text for video content, the first vector also including an audio characteristic indicating a manner of speech associated with the first subtitle text;
   generating, using the first voice synthesis model, a first predicted audio waveform corresponding to a prediction of the first subtitle text being spoken in the indicated manner of speech in a first language by the first actor in the video content;
   receiving, by a second voice synthesis model trained using reinforcement learning to replicate a second set of speech features for the first actor, the first vector;
   generating, using the second voice synthesis model, a second predicted audio waveform corresponding to a prediction of the first subtitle text being spoken in the indicated manner of speech in the first language by the first actor;
   receiving, by a voice synthesis model selector for the first actor, the first predicted audio waveform, the second predicted audio waveform, and a third audio waveform, the third audio waveform representing the first subtitle text being spoken by the first actor in a second language that is different than the first language;
   determining, by the voice synthesis model selector, a first similarity in a duration of the first predicted audio waveform and a duration of the third audio waveform, and a second similarity in a duration of the second predicted audio waveform and the duration of the third audio waveform;

selecting, by the voice synthesis model selector, the first audio waveform based in part on determining that the first similarity between the first predicted audio waveform and the third audio waveform indicates more similarity in duration than the second similarity between the second predicted audio waveform and the third audio waveform;

receiving, by a voice tuner, the first predicted audio waveform selected by the voice synthesis model selector;

generating, by the voice tuner, a fourth audio waveform by modifying at least one audio localization parameter of the first predicted audio waveform, the fourth audio waveform representing a third prediction of the first subtitle text being spoken in the first language by the first actor; and providing, to a video dubbing server, data for associating playback of the fourth audio waveform with playback of image frames of the video content corresponding to the first subtitle text.

2. The method of claim 1, wherein the first voice synthesis model includes at least one of: a long short-term memory recurrent neural network, generative adversarial network, convolutional neural network, or regional convolution neural network, and the second voice synthesis model includes at least one of: a Q learning network, deep Q network, or state reinforcement learning network.

3. The method of claim 1, wherein the at least one audio localization parameter is one of: resonance, accent, or speech rate.

4. The method of claim 1, wherein the first voice synthesis model and the second voice synthesis model is trained with a training set including speech samples for the first actor, the speech samples including speech by the first actor in more than one language.

5. A method, including:
receiving, by a first neural network trained to represent a first set of speech features for a first speaker, a first vector, the first vector including a representation of first subtitle text for video content, the first vector also including an audio characteristic associated with the first subtitle text;

generating, using the first neural network, a first predicted audio of the first subtitle text being spoken in a first language by the first speaker in the video content;

receiving, by a second neural network trained to represent a second set of speech features for the first speaker, the first vector;

generating, using the second neural network, a second predicted audio of the first subtitle text being spoken in the first language by the first speaker;

receiving, by a predicted audio selector for the first speaker, the first predicted audio, the second predicted audio, and third audio, the third audio representing the first subtitle text being spoken by the first speaker in a second language that is different than the first language;

determining, by the predicted audio selector, a first similarity between the first predicted audio and the third audio, and a second similarity between the second predicted audio and the third audio;

selecting, by the predicted audio selector, the first audio based in part on determining that the first similarity between the first predicted audio and the third audio indicates more similarity than the second similarity between the second predicted audio and the third audio;

receiving, by a voice tuner, the first predicted audio selected by the predicted audio selector;

generating, by the voice tuner, fourth audio by modifying at least one audio localization parameter of the first predicted audio, the fourth audio representing a third prediction of the first subtitle text being spoken in the first language by the first speaker; and providing, to a video dubbing server, data for associating playback of the fourth audio with playback of image frames of the video content corresponding to the first subtitle text.

6. The method of claim 5, wherein the representation of the first subtitle text corresponds to a phonetic transcription of the first subtitle text.

7. The method of claim 5, wherein at least one of the first neural network and the second neural network is trained using supervised learning, and at least one of the first neural network and the second neural network is trained using reinforcement learning.

8. The method of claim 5, wherein at least one of the first neural network and the second neural network includes at least one of: a long short-term memory recurrent neural network, generative adversarial network, convolutional neural network, or regional convolution neural network, and at least one of the first neural network and the second neural network includes at least one of: a Q learning network, deep Q network, or state reinforcement learning network.

9. The method of claim 5, wherein the audio characteristic represents a mode of speech for the first subtitle text.

10. The method of claim 5, wherein the first similarity and the second similarity are determined for at least one speaker parameter representing: pitch, volume, tone, duration, inflection, or a speaker-specific feature represented by a hidden state of the first neural network or the second neural network.

11. The method of claim 5, wherein the at least one audio localization parameter is one of: resonance, accent, or speech rate.

12. The method of claim 5, wherein the first neural network and the second neural network is trained with a training set including speech samples for the first speaker, the speech samples including speech by the first speaker in more than one language.

13. A system, comprising one or more computing devices configured to:
receive, by a first neural network trained to represent a first set of speech features for a first speaker, a first vector, the first vector including a representation of first subtitle text for video content, the first vector also including an audio characteristic associated with the first subtitle text;

generate, using the first neural network, a first predicted audio of the first subtitle text being spoken in a first language by the first speaker in the video content;

receive, by a second neural network trained to represent a second set of speech features for the first speaker, the first vector;

generate, using the second neural network, a second predicted audio of the first subtitle text being spoken in the first language by the first speaker;

receive, by a predicted audio selector for the first speaker, the first predicted audio, the second predicted audio, and third audio, the third audio representing the first subtitle text being spoken by the first speaker in a second language that is different than the first language;

determine, by the predicted audio selector, a first similarity between the first predicted audio and the third audio, and a second similarity between the second predicted audio and the third audio;

select, by the predicted audio selector, the first audio based in part on determining that the first similarity between the first predicted audio and the third audio indicates more similarity than the second similarity between the second predicted audio and the third audio;

receive, by a voice tuner, the first predicted audio selected by the predicted audio selector;

generate, by the voice tuner, fourth audio by modifying at least one audio localization parameter of the first predicted audio, the fourth audio representing a third prediction of the first subtitle text being spoken in the first language by the first speaker; and provide, to a video dubbing server, data for associating playback of the fourth audio with playback of image frames of the video content corresponding to the first subtitle text.

14. The system of claim 13, wherein the representation of the first subtitle text corresponds to a phonetic transcription of the first subtitle text.

15. The system of claim 13, wherein at least one of the first neural network and the second neural network is trained using supervised learning, and at least one of the first neural network and the second neural network is trained using reinforcement learning.

16. The system of claim 13, wherein at least one of the first neural network and the second neural network includes at least one of: a long short-term memory recurrent neural network, generative adversarial network, convolutional neural network, or regional convolution neural network, and at least one of the first neural network and the second neural network includes at least one of: a Q learning network, deep Q network, or state reinforcement learning network.

17. The system of claim 13, wherein the audio characteristic represents a mode of speech for the first subtitle text.

18. The system of claim 13, wherein the first similarity and the second similarity are determined for at least one speaker parameter representing: pitch, volume, tone, duration, inflection, or a speaker-specific feature represented by a hidden state of the first neural network or the second neural network.

19. The system of claim 13, wherein the at least one audio localization parameter is one of: resonance, accent, or speech rate.

20. The system of claim 13, wherein the first neural network and the second neural network is trained with a training set including speech samples for the first speaker, the speech samples including speech by the first speaker in more than one language.

* * * * *